US010686330B2

(12) United States Patent
Shevde et al.

(10) Patent No.: US 10,686,330 B2
(45) Date of Patent: Jun. 16, 2020

(54) SMART PRIORITY DETECTION FOR WIRED AND WIRELESS CHARGING

(71) Applicant: QUALCOMM Incorporated, San Diego, CA (US)

(72) Inventors: Sumukh Shevde, Carlsbad, CA (US); William Henry Von Novak, III, San Diego, CA (US); Joseph Maalouf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/642,420

(22) Filed: Jul. 6, 2017

(65) Prior Publication Data
US 2019/0013687 A1    Jan. 10, 2019

(51) Int. Cl.
*H02J 7/00* (2006.01)
*H02J 50/00* (2016.01)

(52) U.S. Cl.
CPC ............ *H02J 50/00* (2016.02); *H02J 7/0047* (2013.01); *H02J 7/00* (2013.01); *H02J 2207/40* (2020.01)

(58) Field of Classification Search
CPC .... H02J 7/025; H02J 7/34; H02J 50/12; H02J 2007/0062; H02J 50/10; H02J 5/005; H02J 50/80; H02J 50/00; H02J 7/007; H02J 13/0017
USPC .................................................. 320/108, 138
See application file for complete search history.

(56) References Cited

U.S. PATENT DOCUMENTS

| 9,318,915 | B2 | 4/2016 | Miller et al. | |
|---|---|---|---|---|
| 2011/0095722 | A1* | 4/2011 | Chang | H02J 7/0055 320/107 |
| 2011/0202777 | A1* | 8/2011 | Hijazi | G06F 1/263 713/300 |
| 2012/0262109 | A1* | 10/2012 | Toya | H01M 10/44 320/108 |

(Continued)

FOREIGN PATENT DOCUMENTS

| EP | 2421116 A2 | 2/2012 |
|---|---|---|
| EP | 2485362 A1 | 8/2012 |

OTHER PUBLICATIONS

International Search Report and Written Opinion—PCT/US2018/035002—ISA/EPO—Jul. 11, 2018.

(Continued)

*Primary Examiner* — Nghia M Doan
(74) *Attorney, Agent, or Firm* — Hunter Clark PLLC/QUALCOMM Incorporated (57) ABSTRACT

Techniques for providing wired and wireless charging to a device are provided. An example of an apparatus for receiving power from a wired power supply and a wireless power supply according to the disclosure includes a wireless power receiver configured to receive power from the wireless power supply, a direct current input circuit configured to receive power from the wired power supply, a control circuit operably coupled to the wireless power receiver and the direct current input circuit and configured to determine a power transfer capability for each of the wired power supply and the wireless power supply, and select the wireless power receiver from the wireless power supply or with the direct current input circuit from the wired power supply to receive power based on the power transfer capabilities.

17 Claims, 7 Drawing Sheets

(56) References Cited

U.S. PATENT DOCUMENTS

| | | | |
|---|---|---|---|
| 2013/0020875 A1* | 1/2013 | Wozniak | H01M 10/46 307/72 |
| 2013/0043833 A1* | 2/2013 | Katz | H01M 10/46 320/108 |
| 2013/0200843 A1 | 8/2013 | Tanabe et al. | |
| 2013/0207602 A1 | 8/2013 | Fukaya et al. | |
| 2013/0278207 A1* | 10/2013 | Yoo | H02J 7/0052 320/108 |
| 2014/0203661 A1* | 7/2014 | Dayan | H01F 38/14 307/104 |
| 2016/0077562 A1* | 3/2016 | Smith | G06F 1/266 713/310 |
| 2016/0094080 A1* | 3/2016 | Dong | H01M 10/4257 320/108 |
| 2016/0359339 A1 | 12/2016 | Hwang et al. | |

OTHER PUBLICATIONS

"Wireless Charging—Forcing Nexus 5 to Charge Wirelessly Even When USB Device Connected", Android Enthusiasts Stack Exchange, Retrieved from internet on Feb. 13, 2017, http://android.stackexchange.com/questions/81677/forcingnexus5tochargewirelesslyevenwhenusbdeviceconnected, 1 Page.

Rubino D., "Can you 'supercharge' a Nokia Lumia 920 with Wireless and Wired Charging?", Retrieved from internet on Feb. 13, 2017, http://www.windowscentral.com/superchargenokialumia920wirelesswiredcharging, pp. 1-4.

* cited by examiner

Prior Art

SMART PRIORITY DETECTION FOR WIRED AND WIRELESS CHARGING

FIELD

This application is generally related to power charging of chargeable devices, and more particularly to providing wired and wireless charging to a device.

BACKGROUND

A variety of electrical and electronic devices are powered via rechargeable batteries. Such devices include electric vehicles, mobile phones, portable music players, laptop computers, tablet computers, computer peripheral devices, communication devices (e.g., Bluetooth® devices), digital cameras, hearing aids, and the like. Rechargeable devices may be charged via wired connections through cables or other similar connectors that are physically connected to a power supply. Wireless charging systems are also being used to transfer power in free space to be used to charge rechargeable electronic devices or provide power to electronic devices. Many devices are configured to accommodate both wired and wireless charging options. Traditionally, wired charging has been generally viewed as being capable of providing higher power as compared to the wireless option and wired charging has been given a priority over wireless charging. Improvements in wireless charging technology, however, are challenging this assumption since some wireless charging systems may be capable of providing higher power than a wired source. There is a need to establish a priority between wired and wireless charging sources at run time when both sources are present.

SUMMARY

An example of an apparatus for receiving power from a wired power supply and a wireless power supply according to the disclosure includes a wireless power receiver configured to receive power from the wireless power supply, a direct current input circuit configured to receive power from the wired power supply, a control circuit operably coupled to the wireless power receiver and the direct current input circuit and configured to determine a power transfer capability for each of the wired power supply and the wireless power supply, and select the wireless power receiver from the wireless power supply or with the direct current input circuit from the wired power supply to receive power based on the power transfer capabilities.

Implementations of such an apparatus may include one or more of the following features. The control circuit may be further configured to determine one or more charge state values associated with the apparatus such that the selection is further based on the one or more charge state values. A thermal sensor and the one or more charge state values may include a temperature value. A battery and the one or more charge state values may include a battery charge value. The apparatus may be configured to detect a proximate device and the one or more charge state values includes an indication of the proximate device. The direct current input circuit may be operably coupled to the wired power supply via a Universal Serial Bus (USB) connector. The control circuit may be configured to determine the power transfer capability of the wired power supply based on a state of a data line in the USB connector. The control circuit may be configured to determine the power transfer capability of the wired power supply based on an enumeration process with the wired power supply. The control circuit may be configured to determine the power transfer capability of the wireless power supply based on a signal received from the wireless power supply.

An example of a method for providing power from a power source according to the disclosure includes detecting, at a first device, an availability of a wired power connection between the first device and a wired power source and a wireless power connection between the first device and a wireless power source, determining, at the first device, an amount of power available to be received via the wireless power connection and an amount of power available to be received via the wired power connection, and selecting, by the first device, to receive power from the wired power connection or the wireless power connection based on the determination.

Implementations of such a method may include one or more of the following features. Detecting availability of the wireless power connection may include utilizing a signaling protocol between the first device and the wireless power source. Determining one or more charging state values of the first device such that the selection is further based on the one or more charging state values. The one or more charging state values may include at least one temperature value associated with the first device such that the at least one temperature value satisfies a threshold value, and selecting the wired power connection or the wireless power connection associated with a lower amount of available power. Determining the amount of power available from the wireless power connection may include receiving power via the wireless power connection, and determining an actual amount of the power received via the wireless power connection. The selection may be based on comparing the actual amount of the power received via the wireless power connection with the amount of power available via the wired power connection.

An example of an apparatus for receiving power from a wired power supply and a wireless power supply according to the disclosure includes means for receiving power from the wireless power supply, means for receiving power from the wired power supply, means for determining a power transfer capability for each of the wired power supply and the wireless power supply, and means for selecting the wireless power supply or the wired power supply to receive power based on the power transfer capabilities.

An example of a non-transitory processor-readable storage medium according to the disclosure includes processor-readable instructions configured to cause one or more processors to providing power from a power source, including code for detecting an availability of a wired power connection between a first device and a wired power source and a wireless power connection between the first device and a wireless power source, code for determining an amount of power available to be received via the wireless power connection and an amount of power available to be received via the wired power connection, and code for selecting to receive power from the wired power connection or the wireless power connection based on the determination.

Items and/or techniques described herein may provide one or more of the following capabilities, as well as other capabilities not mentioned. A power receiving device such as a smart phone, tablet, laptop, etc. may be connected to a wired power supply and a wireless power supply. The charging capabilities of the wired and wireless power supplies may be evaluated. The power receiving device may select to receive power from the power supplies based on the amount of power available from each supply. The power available from each supply may be monitored during charging operations and the power receiving device may periodically reevaluate which supply to use. The power supply may be selected to minimize charging time. The state of the power receiving device may be used to select a power supply. The state of the power receiving device may include a temperature value. A wired power supply may be selected to preserve the capabilities of the wireless power supply for other power receiving devices. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for providing wired and wireless power transfer to an electronic device. Wired power transfer may refer to coupling the electronic device to a direct current (DC) power source with a physical electrical conductor. Wireless power transfer may refer to transferring any form of energy associated with electric fields, magnetic fields, electromagnetic fields, or otherwise from a transmitter to a receiver without physical electrical conductors attached to and connecting the transmitter to the receiver to deliver the power (e.g., power may be transferred through free space). The power output into a wireless field (e.g., a magnetic field or an electromagnetic field) may be received, captured by, or coupled to by a power receiving element to achieve power transfer. The transmitter transfers power to the receiver through a wireless coupling of the transmitter and receiver.

The output power of a receiver in a wireless power transfer may be regulated by varying the reactance of a resonant network (i.e., resonant circuit) within the receiver. In an example, tuning the resonant network closer to resonance or further away from resonance may be used to control the output power efficiently without using DC-DC power converters fed by a rectifier in the receiver. Electronic devices with wireless charging capabilities generally also include a wired charging mechanism. For example, an electric device may be configured to receive power via a wireless system (i.e., charging pad), or through a wired system (i.e., DC or Universal Serial Bus (USB) input). In a typical configuration, the electronic device may include two separate power paths to charge/operate the device. For example, the wireless path may include a circuit with a pick-up coil to provide an AC signal to rectification circuitry and other power electronics to provide power (e.g., charge a battery). There may also be separate circuitry to provide a path for wired charging (e.g., USB, DC input, or other wired power sources). Traditionally, if an electronic device includes both wired and wireless power paths, the wired power path is given priority over the wireless power path. This prioritization was acceptable because wired chargers were generally configured to provide more power to the device than wireless charging systems. This traditional approach, however, may present challenges as the effectiveness of wireless charging increases. For example, an AirFuel Alliance® compatible/certified cat 4 device (e.g., a smartphone) may be configured to receive approximately 13 Watts of power wirelessly. If the same device is also connected to a PC via a PC USB cable, then a traditional PC USB interface will only provide approximately 2.5 W of power to the charge port. In this example, the wireless charging can deliver approximately 4× the amount of power as compared to wired charging. Using the default priority of wired charging, charging time in this case will be much longer than with wireless charging. As described herein, smart priority detection for wired and wireless charging may be used to establish a priority between wired and wireless charging at run time such that the correct source may be used for charging the device when both sources are present and available.

Figure 1:
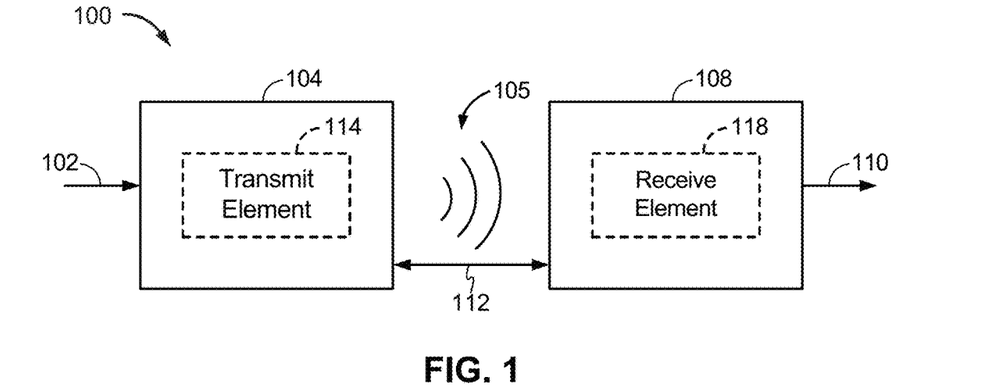
FIG. 1 is a functional block diagram of an exemplary wireless power transfer system.

FIG. 1 is a functional block diagram of an example of a wireless power transfer system 100. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) that is coupled to receive the output power 110. The transmitter 104 and the receiver 108 are separated by a non-zero distance 112. The transmitter 104 includes a power transmitting element 114 configured to transmit/couple energy to the receiver 108. The receiver 108 includes a power receiving element 118 configured to receive or capture/couple energy transmitted from the transmitter 104. The receiver 108 may be a power receiving device.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that up to about one wavelength, of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
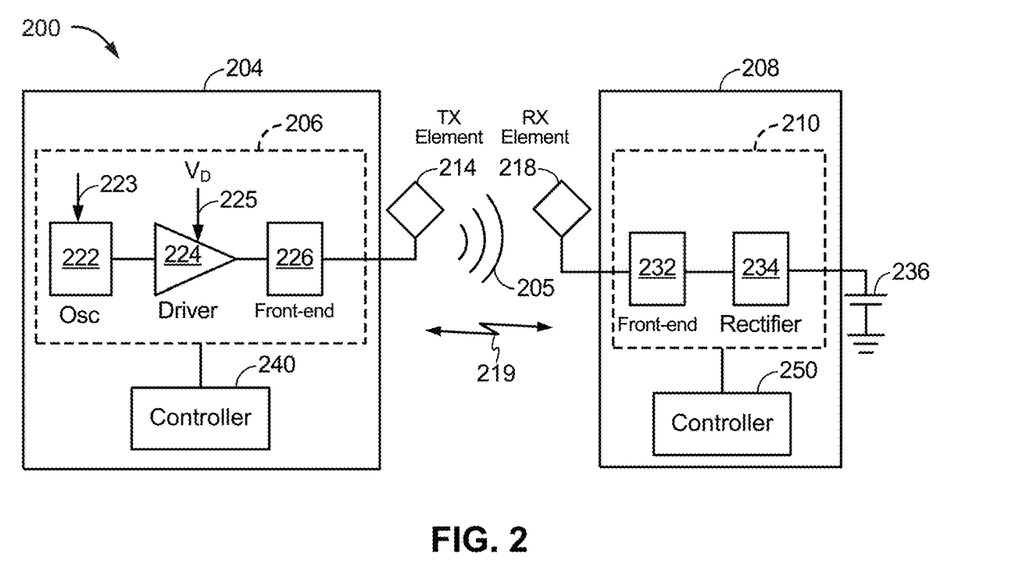
FIG. 2 is a functional block diagram of an example of another wireless power transfer system.

FIG. 2 is a functional block diagram of an example of a wireless power transfer system 200. The system 200 includes a transmitter 204 and a receiver 208. The transmitter 204 (e.g., PTU) is configured to provide power to a power transmitting element 214 that is configured to transmit power wirelessly to a power receiving element 218 that is configured to receive power from the power transmitting element 214 and to provide power to the receiver 208. Despite their names, the power transmitting element 214 and the power receiving element 218, being passive elements, may transmit and receive power and communications.

The transmitter 204 includes the power transmitting element 214, transmit circuitry 206 that includes an oscillator 222, a driver circuit 224, and a front-end circuit 226. The power transmitting element 214 is shown outside the transmitter 204 to facilitate illustration of wireless power transfer using the power transmitting element 214. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a class-E amplifier or other amplifier (e.g., configured to receive a square wave from the oscillator 222 and output a sine wave).

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless signal (field) 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
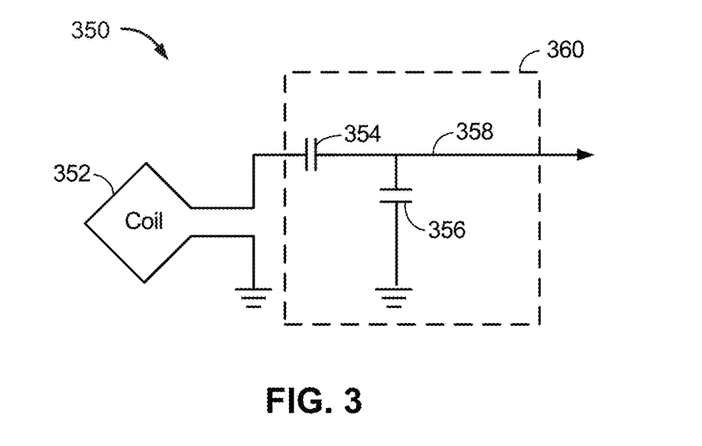
FIG. 3 is a schematic diagram of a portion of transmit circuitry or receive circuitry of FIG. 2 including a transmit or receive element.

The receiver 208 (e.g., a wireless power receiving unit (PRU)) includes the power receiving element 218, and receive circuitry 210 that includes a front-end circuit 232 and a rectifier circuit 234. The rectifier circuit 234 generally includes high speed switches such as metal-oxide semiconductor field-effect transistors (MOSFETS) in a half-bridge or full-bridge topology. The power receiving element 218 is shown outside the receiver 208 to facilitate illustration of wireless power transfer using the power receiving element 218. The front-end circuit 232 may include matching circuitry configured to match the impedance of the receive circuitry 210 to the impedance of the power receiving element 218. As will be explained below, the front-end circuit 232 may further include a tuning circuit to create a resonant circuit within the power receiving element 218. The rectifier circuit 234 may generate a DC power output from an AC power input to charge the battery 236, as shown in FIG. 3. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to a wireless signal such as the wireless field 205 and generate an output power for storing or consumption by a battery (or load) 236 coupled to the output or receive circuitry 210. In this example, the generated output power is associated with the resonant circuit in the front end 232 because the tuning of the resonant circuit will impact the amount of output power generated.

The receiver 208 further includes a controller 250 that may be configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to try to minimize transmission losses between the transmitter 204 and the receiver 208.

FIG. 3 is a schematic diagram of an example of a portion of the transmit circuitry 206 or the receive circuitry 210 of FIG. 2. While a coil, and thus an inductive system, is shown in FIG. 3, other types of systems, such as capacitive systems for coupling power, may be used, with the coil replaced with an appropriate power transfer (e.g., transmit and/or receive) element. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
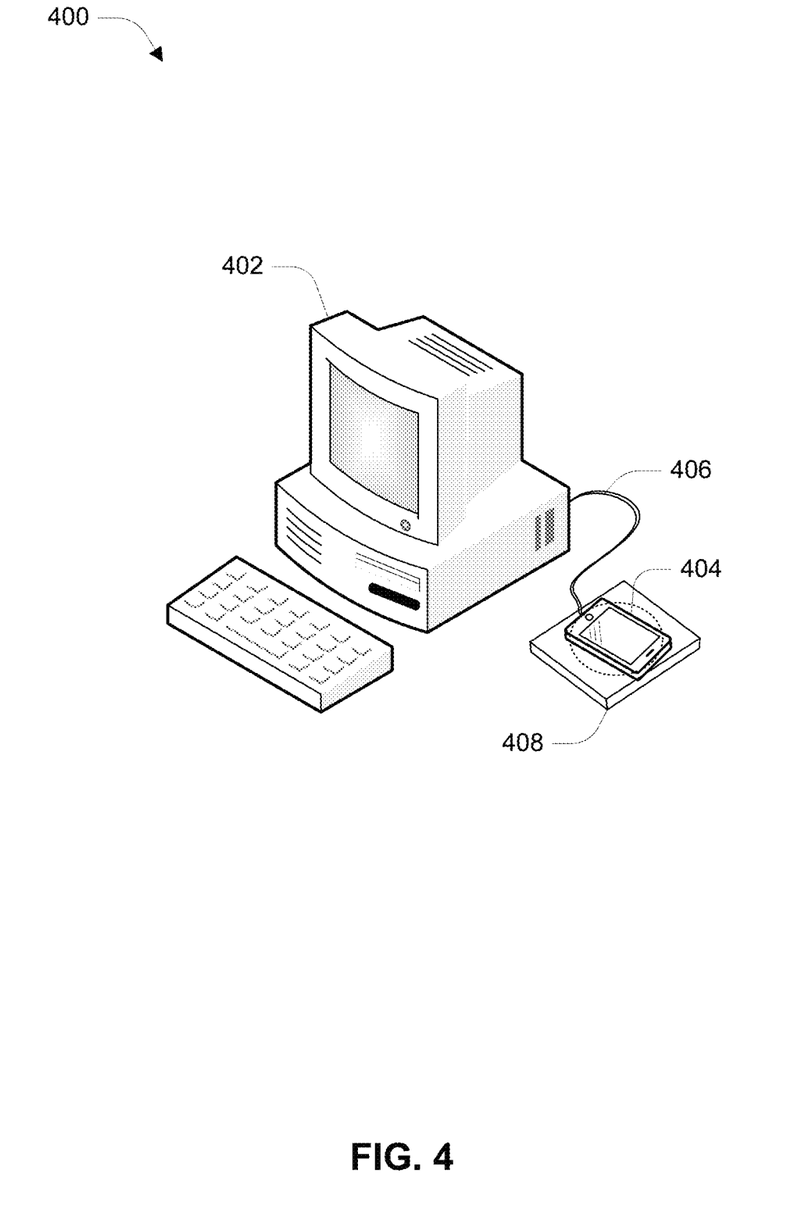
FIG. 4 is an illustration of an example use case for wired and wireless charging.

Referring to FIG. 4, an illustration of an example use case 400 for wired and wireless charging is shown. The use case 400 includes a computer 402, a mobile device 404, a wired connection 406, and a wireless charging pad 408. The mobile device 404 may include a receiver 208 and the wireless charging pad 408 may include a transmitter 204 as depicted in FIG. 2. The use case 400 illustrates an operational example such as when a user connects the mobile device 404 to the computer 402 via the wired connection 406 (e.g., a USB cable connector) to download photos from the mobile device 404 to the computer 402. In an example, the computer 402 may provide 500 mA of charging power to the mobile device (e.g., 2.5 W). If the smartphone is simultaneously placed on a wireless charging pad 408, which may be capable of providing 10-16 W of charging power, then the mobile device 404 is configured to switch from receiving power via the wired connection 406 (e.g., the USB cable) to receiving power from the wireless charging pad 408. The capabilities of the wired connection 406 and wireless charging pad 408 may be obtained via in-band and out-of-band communications between the computer 402 and the mobile device 404, and between the wireless charging pad 408 and the mobile device 404. For example, the power available from a wired connection 406 may be obtained by methods such as an enumeration process (e.g., communication with the USB port on the computer 402), Battery Charging 1.2 (BC 1.2) methods, measurements or state of the data line(s) of the wired connection 406 (e.g., Data+ and Data−(D+/D−) lines in the USB connector), as well as other proprietary signaling techniques. The capabilities of the wireless charging pad 408 may be determined via Bluetooth communications between the mobile device 404 and the wireless charging pad 408. For example, the wireless charging pad 408 may be configured to send Power Transmitting Unit (PTU) classification information element per one or more communication protocols.

In operation, one or more control circuits in the mobile device 404 are configured to select the power input from either the wired connection 406 or the wireless charging pad 408 based on established or in-situ charging requirements. For example, the requirements may include minimizing charge time (i.e., select the highest power source) and controlling the temperature of the smartphone (i.e., utilize the lower power source). Other charging requirements may be based on the capabilities of the wireless charging pad 408. For example, the wireless charging pad 408 may be configured to charge multiple devices in a power sharing mode (e.g., reduced power to each device). In this example, the mobile device 404 may be configured to receive power from the wired connection 406 to improve charging for the other devices on the wireless charging pad 408.

Figure 5:
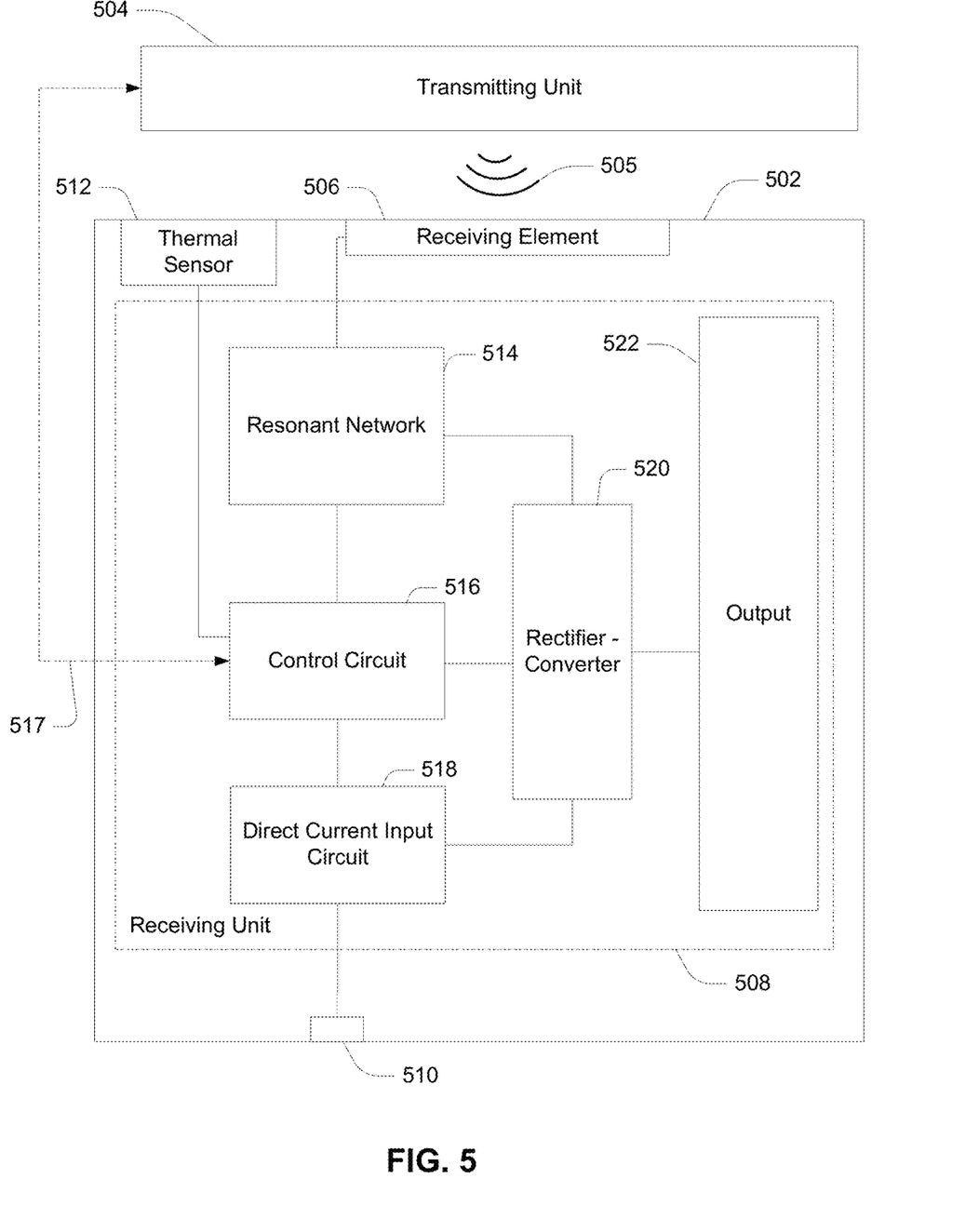
FIG. 5 is a functional block diagram of an example a power receiving device.

Referring to FIG. 5, a functional block diagram of an example power receiving device 502 is shown. The power receiving device 502 may include a receiving unit 508 configured to power from a transmitting unit 504. The receiving unit 508 and the transmitting unit 504 may be a respective receiver 208 and transmitter 204 depicted in FIG. 2. The transmitting unit 504 is configured to generate a time-varying magnetic (or electromagnet) wireless field 505. The power receiving device 502 is disposed such that the wireless field 505 may induce a current in a receiving element 506 attached to or within the power receiving device 502. A resonant network 514 is configured to resonate at frequencies near the frequency of wireless field 505 to assist in the efficient transfer of energy. An alternating current (AC) signal induced in the receiving element 506 and the resonant network 514 may be rectified and converted (e.g., DC-DC conversion via a buck, boost, buck-boost, or other converter circuit) in a rectifier-converter element 520 to produce a direct current (DC) signal that may be provided to an output 522. For example, the output 522 may charge an energy storage device (e.g., a battery) or provide power to a load.

The power receiving device 502 is also configured to receive power from a wire connection via a connection port

510. For example, the connection port 510 may be configured to receive a USB cable or other power cable/connector. A direct current input circuit 518 may be configured to utilize one or more detection methods to determine the capabilities of the wired connection. The direct current input circuit 518 may be a standard downstream port (SDP), a dedicated charging port (DCP), or a charging downstream port (CDP) that allows for both high-current charging and data transfer. The direct current input circuit 518 may be capable of determining the power range of a source based on techniques such as an enumeration process and the USB battery charging specification rev. 1.2 (BC 1.2). For example, referring to FIG. 6, the direct current input circuit 518 may be configured to detect proprietary dedicated chargers based on a DC level set on the D+ and D− lines by a resistor-divider between 5V and ground. In an example, the direct current input circuit 518 may support the Qualcomm Quick Charge (QC) 2.0/3.0/4.0 High Voltage Dedicated Charging Port (HVDCP) Class AB specification. The direct current input circuit 518 may provide a DC signal to the rectifier-converter element 520 for DC-DC conversation. In an example, the direct current input circuit 518 may be operably coupled to the output 522 can configured to provide a variable DC voltage to the output 522.

A control circuit 516 may be operably coupled to the resonant network 514 and the direct current input circuit 518. The control circuit 516 may be one or more processors or Application Specific Integrated Circuits (ASICs) configured to control the charging operations in the power receiving device 502. The control circuit 516 may be a System on Chip (SoC) device or may include several discrete devices. For example, the control circuit 516 may include power management integrated circuits and wireless communications circuits (e.g., a transceiver). The control circuit 516 may be configured to control one or more variable reactive elements within the resonant network 514 to control the wireless power transfer. The control circuit 516 may receive wired charging power range information from the direct current input circuit 518 based on an enumeration process, BC 1.2, or other detection methods. The control circuit 516 may be configured to provide commands to the direct current input circuit 518 to select the charging voltage (e.g., in HVDCP implementations). The control circuit 516 may include a wireless transceiver circuit configured to communicate with the transmitting unit 504 via a wireless connection 517 with a signaling protocol such as Bluetooth®, Bluetooth Low Energy (BLE), 2.4 GHz ISM, or another peer-to-peer communications standard. For example, the Alliance for Wireless Power (A4WP) provides for standards in wireless power transfer control/management protocols and signaling. The A4WP control messaging may include signals to enable the control circuit 516 to adjust the current in the transmitting unit 504. Other information regarding the state of the transmitting unit 504 and the power receiving device 502 may be exchanged between one another. For example, the control circuit 516 may be configured to monitor state variables associated with the thermal sensor 512 (i.e., backside temperature), orientation, current application executions, a battery charge value (e.g., 0-100%), and other device parameters associated with the operation of the power receiving device 502. The A4WP signaling may also use the Bluetooth 4 Generic Attribute (GATT) framework to allow the transmitting unit 504 and power receiving device 502 to automatically pair when they are within range of one another.

Figure 6:
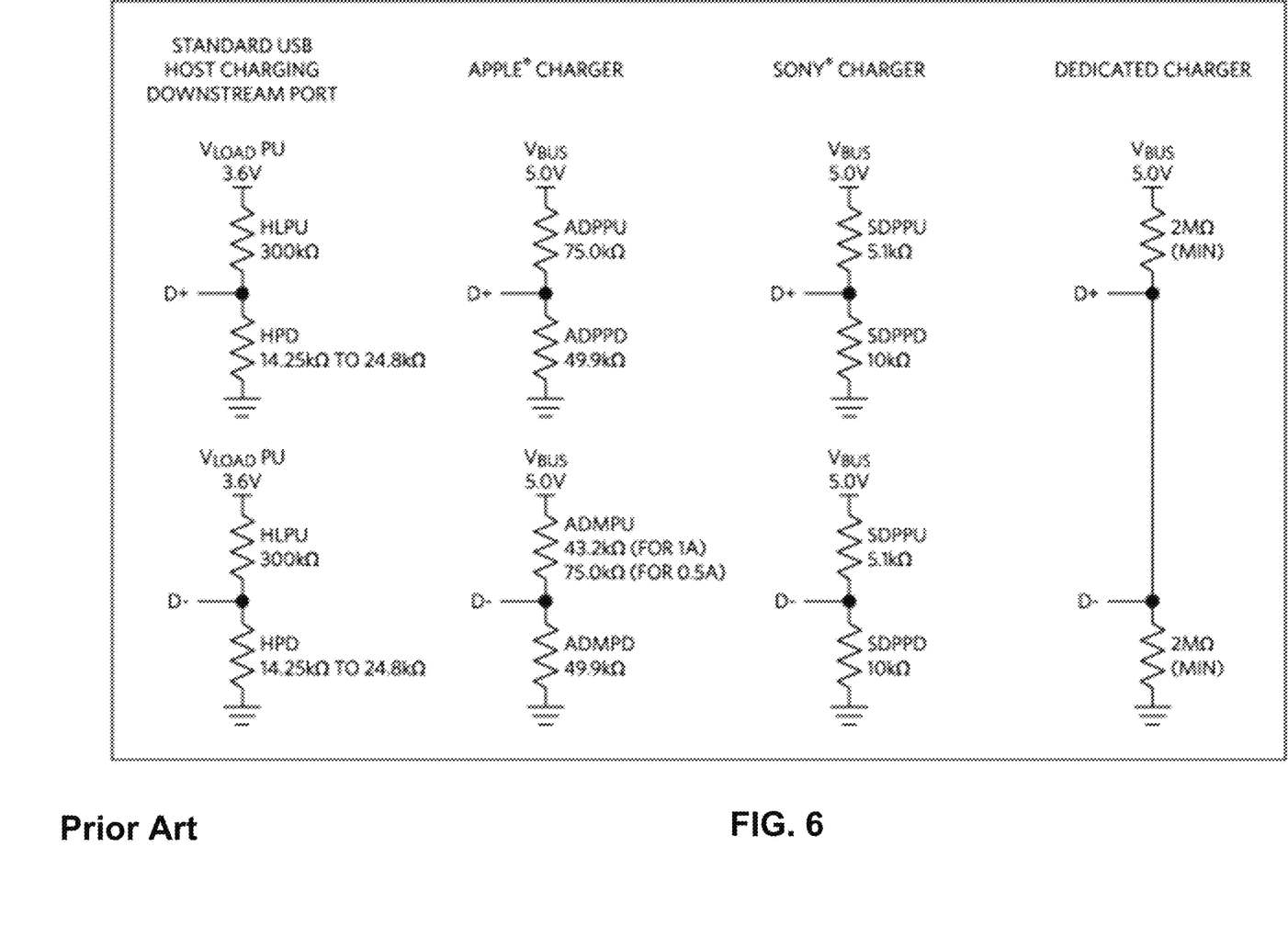
FIG. 6 includes prior art configurations for wired charging schemes.

In operation, the control circuit 516 may be configured to detect the type of wired charging source that is coupled to the connection port 510 and to calculate how much power is actually available from that source. The direct current input circuit 518 may be configured to monitor the USB+ and USB− (e.g., D+, D−) lines on the connection port 510 to determine the corresponding wired charging scheme such as illustrated in FIG. 6. The control circuit 516 may also be configured to detect the power available by a wireless charging source such as the transmitting unit 504. The amount of wireless power available may be determined via the wireless connection 517 based on the exchanged transmitter and receiver capabilities and device state information. The amount of wireless power available may also be measured in the power receiving device 502 (e.g., voltage across the receiving element 506, voltages in the resonant network 514, etc.). The control circuit 516 may utilize the values of the available wireless and wired power to choose the appropriate charging methodology and improve the battery charging time. The control circuit 516 may also monitor one or more state variables within the power receiving device 502 and the transmitting unit 504 (e.g., via the wireless connection 517 or with the wireless field 505 with in-band communications techniques) and choose an appropriate charging methodology based on the current state of either or both of the transmitter and the receiver.

The ability of the control circuit 516 to monitor the state of the transmitting unit 504 and the power receiving device 502 improves the flexibility of the charging solution. For example, in a first scenario, the control circuit 516 may initially select the wireless charging as the priority over wired charging and the charging system may be in steady state. If the user places another device on the transmitting unit 504 (e.g., within the wireless field 505), the transmitting unit 504 may enter a power share mode such that the power provided to each of the devices may decrease. The control circuit 516 will recognize the reduction in available wireless power and determine if wireless charging is the appropriate methodology when the transmitting unit is in a power share state. If the wireless power available to the power receiving device 502 drops below the available wired power level, the control circuit 516 may be configured to switch the priority over to the wired charging.

In some cases the actual amount of power available from a wired source may not comport with the value associated with the D+ and D− voltages. For example, some USB power supplies are designed to current limit and fold back voltages during conditions of heavy current draw. In this fold back condition, the wired power source will not supply the expected power. In a standard USB dedicated charger, for example, the power receiving device 502 may attempt to draw maximum power (i.e., 9 watts) from the charger and see the voltage fold back at 1.2 volts. The direct current input circuit 518 may then reduce its draw and set the maximum available wired power level to 6 watts.

The control circuit 516 may change the charging methodology based on other criteria as well. In an example, the charging methodology may be based on controlling battery temperature. In some cases the control circuit 516 may choose the source of power that will result in the least heating of the battery. The temperature may be detected with the thermal sensor 512. The charging methodology may be selected in an effort to free up a scarce resource. For example, if the control circuit 516 determines that the power receiving device 502 may draw most or all the available power from the transmitting unit 504 (e.g., when multiple receiving devices are already on the transmitting unit 504), the control circuit 516 may be configured to select the wired source rather than power-limit the transmitting unit 504. In an embodiment, the control circuit 516 may be configured to combine both the wireless and wired power sources to achieve even shorter charge times.

Figure 7:
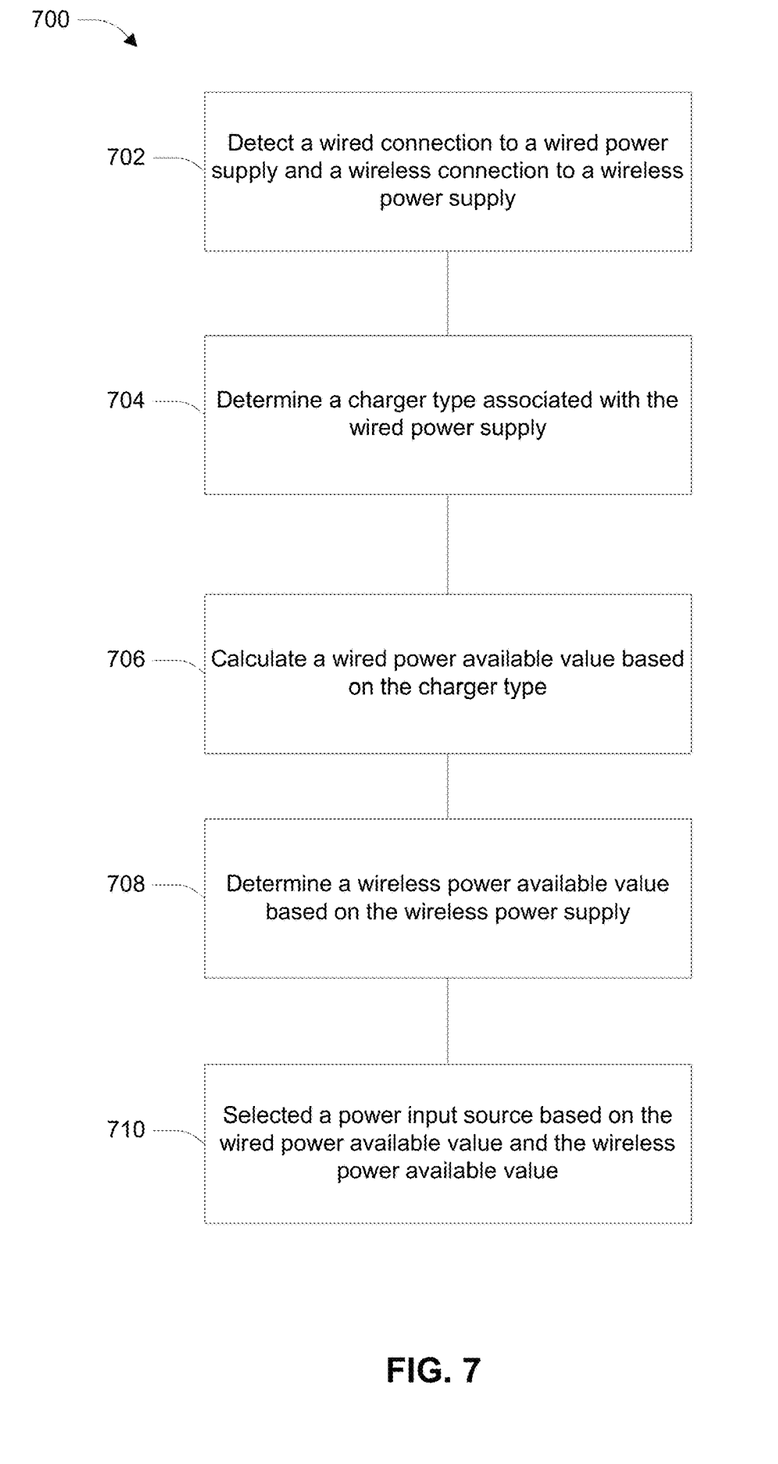
FIG. 7 is a flowchart of an example method for selecting wired and wireless power inputs.

Referring to FIG. 7, with further reference to FIG. 5, an example of a method 700 for selecting wired and wireless power is shown. The method 700 is, however, an example only and not limiting. The method 700 can be altered, e.g., by having stages added, removed, rearranged, combined, performed concurrently, and/or having single stages split into multiple stages. The power receiving device 502 is an example of a means for performing the elements of the method 700.

At stage 702, the method includes detecting a wired connection to a wired power supply and a wireless connection to a wireless power supply. The control circuit 516 may be means for detecting wired and wireless connections. A wired connection may be coupled to power receiving device via one or more ports such as the connection port 510. A direct current input circuit 518, or the control circuit 516, may be configured to detect the presence of a connector in the connection port 510. For example, for a USB connection, the control circuit 516 may receive an indication of the presence of a voltage on the USB voltage bus. The control circuit 516 may be configured to detect a wireless connection based on voltages induced in the resonant network 514 when the power receiving device is disposed in the wireless field 505. The control circuit 516 may also detect the presence of a wireless power supply with a wireless connection 517. For example, the wireless connection 517 may be a Bluetooth connection and control circuit 516 may be configured to pair with a wireless power supply when the wireless connection 517 is made.

At stage 704, the method includes determining a charger type associated with the wired power supply. The control circuit 516 or the direct current input circuit 518 may be a means for determining a charger type. The control circuit 516 may include a data structure or other forms of persistent memory to associate a charger type with a detection method. The control circuit 516 may have access to one or more data tables including fields indicating a charger type, detection method, and power range. An example data set is included in Table 1 below:

TABLE 1

| Charger Type | Detection method | Power range |
| --- | --- | --- |
| USB - PC | Enumeration | .5 W-2.5 W |
| USB - dedicated | BC 1.2 method | Up to 9 W |
| USB - proprietary | D+/D− divider | Varies |
| QC 2.0 | HVDCP primary detection | Up to 21.6 W |
| QC 3.0 class A | HVDCP secondary detection | Up to 21.6 W |
| QC 3.0 class B | HVDCP secondary detection | Up to 36 W |

The example data set may be expanded to include additional charger types and the associated detection methods and power ranges. The enumeration process detection method may require communication between the control circuit 516 and the charger (e.g., computer USB port). The BC 1.2 and D+/D− divider detection methods may be based on voltage measurements on the D+ and D− lines in a USB connector. The HVDCP detection methods may be selectable based on signals from the control circuit 516. For example, an HVDCP controller may allow the USB-bus voltage to be controlled in discreet steps from 3.6V to 20V. In an embodiment, the direct current input circuit 518 may be a HVDCP controller. The control circuit 516 may be configured to utilize other detection methods to determine a charger type.

At stage 706, the method includes calculating a wired power available based on the charger type. The control circuit 516 may be a means for calculating a wired power available. Calculating the wired power available may be performed simultaneously with determining the charger type at stage 704. For example, as indicated in Table 1, a correlation between a power range and a corresponding detection method may be used to calculate the wired power available.

At stage 708, the method includes determining a wireless power available based on the wireless power supply. The control circuit 516 may be a means for determining a wireless power available. The control circuit 516 may utilize the wireless connection 517 to receive specification data from the transmitting unit 504. In an example, A4WP signaling may utilize BLE to provide the control circuit 516 with the power output capabilities of the transmitting unit 504. The control circuit 516 may also be configured to demodulate information encoded into the wireless field 505 (i.e., in-band signaling).

At stage 710, the method includes selecting a power input source based the wired power available value and the wireless power available value. The control circuit 516 may be a means for selecting the power input source. In an example, the control circuit 516 may be configured to select the higher of the wired power available value and the wireless power available value as the power input source. In an operational example, a user may connect a power receiving device 502 such as a smart phone to a computer via a connection port 510 (e.g., a USB cable connector) to download photos from the smart phone to the computer. In this example, the computer is acting as a wired power supply and may provide 500 mA of charging power to the smartphone (e.g., 2.5 W). If the smartphone is simultaneously placed on a wireless charging pad (e.g., a wireless power supply), which provides a signal to indicate the wireless charging pad is capable of providing 10-16 W of charging power, then the control system in smartphone is configured to switch from the wired power supply (i.e., the USB cable) to the wireless charging pad via a tuning circuit such as the resonant network 514. In an embodiment, the control circuit 516 may be configured to receive power from both the wired and wireless power supplies simultaneously.

Figure 8:
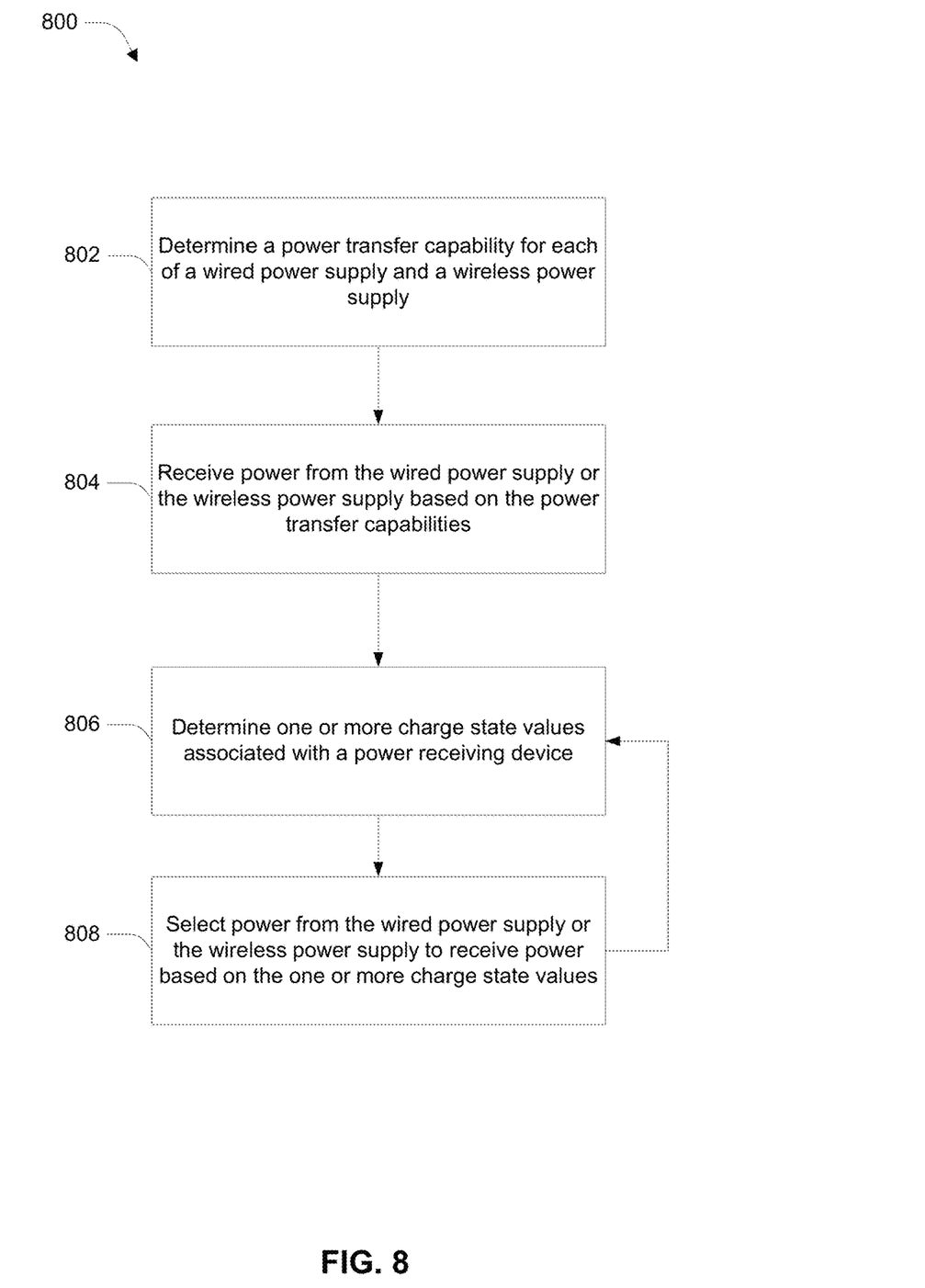
FIG. 8 is a flowchart of an example method for selecting a power source based on the state of a power receiving device.

Referring to FIG. 8, with further reference to FIG. 5, an example of a method 800 for selecting a power source based on the state of a power receiving device is shown. The method 800 is, however, an example only and not limiting. The method 800 can be altered, e.g., by having stages added, removed, rearranged, combined, performed concurrently, and/or having single stages split into multiple stages. The power receiving device 502 is an example of a means for performing the elements of the method 800.

At stage 802, the method includes determining a power transfer capabilities for each of a wired power supply and a wireless power supply. The control circuit 516 may be a means for determining power transfer capabilities. The power transfer capabilities for a wired power supply may be determined when a connection wire is coupled to a power receiving device 502. For example, a USB cable may be connected to the connection port 510. The control circuit 516, or a direct current input circuit 518, may be configured to obtain the power transfer capabilities based on the detection methods described in Table 1. The control circuit 516 may utilize a wireless connection 517 or the wireless field 505 to determine the power transfer capabilities of the wireless power supply (e.g., the transmitting unit 504). For example, A4WP signaling protocols may be used to exchange system parameters between the power receiving device 502 and the transmitting unit 504. The system parameters may indicate a power transfer value that the transmitting unit 504 is capable of providing to the power receiving device 502.

At stage 804, the method includes receiving power from the wired power supply or the wireless power supply based on the power transfer capabilities. The connection port 510 and the resonant network 514 (including the receiving element 506) are means for receiving power from a respective wired or wireless power supply. In an example, the control circuit 516 may be configured to receive power from the supply with the highest power transfer capability. Other criteria may be used to determine which supply to receive power from. User options, time of day information, current battery charge state, or other conditions may be used to select either a wired or wireless source. For example, the power receiving device may default to wired charging in the evening hours or when the charge remaining is greater than 80%.

At stage 806, the method includes determining one or more charge state values associated with a power receiving device. The control circuit 516 may be means for determining one or more charge state values. Charging operations may change the current state of the power receiving device 502. For example, during wireless charging, the current flowing in the receiving element 506 may cause the surrounding area to heat up. A thermal sensor 512 may be configured to provide a temperature state value to the control circuit 516. The control circuit 516 may be configured to determine if the temperature state value exceeds a safety threshold value (e.g., 38-40° C.). Other state values such as battery charge state, orientation, call status, neighbor reports, and voltages within the charging circuits may be available to the control circuit 516. The control circuit 516, or other processing units within the power receiving device 502, may monitor the system state values to determine state changes during charging operations.

At stage 808, the method includes selecting power from the wired power supply or the wireless power supply to receive power based on the one or more charger state values. The control circuit 516 may be configured to enable current flow from the resonant network 514 or the direct current input circuit 518 to the output 522 (e.g., via the rectifier-converter element 520). In an embodiment, both the resonant network 514 and the direct current input circuit 518 may provide power to the output 522. The control circuit 516 may select the power supply based on system requirements or user preferences. For example, if the temperature state value is above the safety threshold value, then the control circuit 516 may be configured to cease wireless charging and receive power from the wired power supply. In an example, a battery charge state value may be used to select wired charging (e.g., use the wired connection to maintain a 90% to full charge state). The presence of an audio speaker system (e.g., as detected via a Bluetooth scan) may be used to secure wireless charging and start wired charging in an effort to minimize the electromagnetic interference (EMI) on the audio channels within the speaker system. In an example, the charge state values may relate to the actual power being delivered by the wired and wireless power supplies. For example, if a USB power supply is folding back (i.e., reducing) the expected output based on other power supply side requirements, the power receiving device 502 may determine that the wireless power supply is preferable over the reduced output from the wired power supply. Alternatively, alignment and orientation issues between the power receiving device 502 and the transmitting unit 504 may decrease the expected power transfer capabilities of the wireless power supply. In this case, the control circuit 516 may monitor the actual voltages in the resonant network 514 and determine that charging time may be reduced if priority is given to the wired power supply. The detection of the charge state values during charging operations provides the power receiving device 502 with the flexibility to select an appropriate power source as the state of the device changes.

Figure 9:
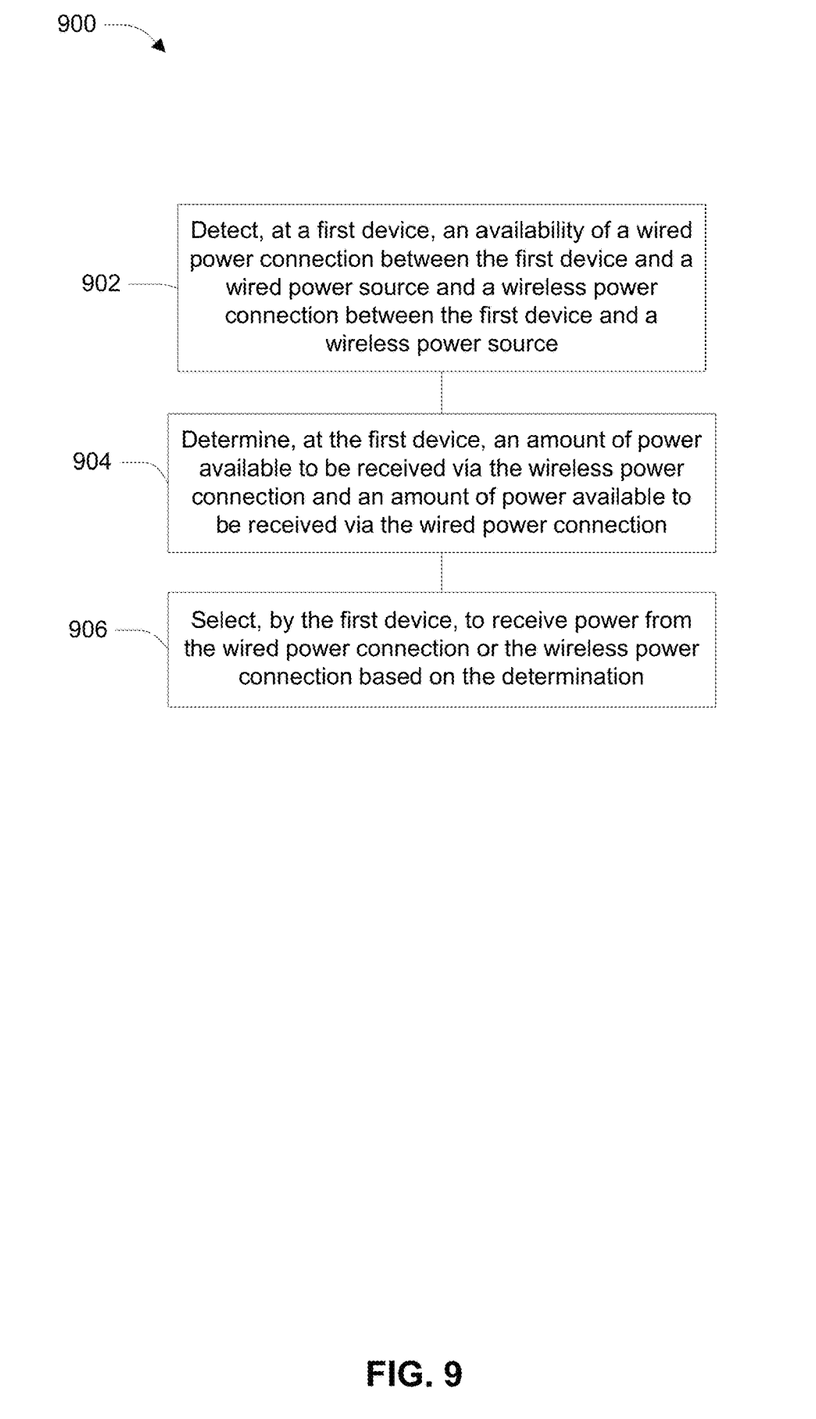
FIG. 9 is a flowchart of an example method for selecting a power source based on a charging impact to a power receiving device.

Referring to FIG. 9, with further reference to FIG. 5, an example of a method 800 for selecting a power source based on a charging impact to a power receiving device is shown. The method 900 is, however, an example only and not limiting. The method 900 can be altered, e.g., by having stages added, removed, rearranged, combined, performed concurrently, and/or having single stages split into multiple stages. The power receiving device 502 is an example of a means for performing the elements of the method 900.

At stage 902, the method includes detecting, at a first device, an availability of a wired power connection between the first device and a wired power source and a wireless power connection between the first device and a wireless power source. The first device may be a power receiving device 502 and the wired power source may be coupled to the connection port 510. The capabilities of the wired power source may be determined by one or more detection methods such as enumeration, BC 1.2, D+/D− divider, or other HVDCP control techniques. The control circuit 516 may be configured to determine the charging capabilities of the wired power connection based on the detection methods. The control circuit 516 may also utilize the wireless connection 517 to receive specification and charging operations data from the transmitting unit 504. A4WP signaling may utilize BLE to provide the control circuit 516 with the power output status of the transmitting unit 504. The power output status may indicate that one or more additional devices may also be receiving power from the transmitting unit 504. In an example, the power receiving device 502 may establish an electronic connection with the other devices to determine a cumulative amount of power (e.g., a cumulative power requirement) that is being received by the devices. The transmitting unit 504 may be configured to provide the specification and charging operations data via in-band techniques with the wireless field 505.

At stage 904, the method includes determining, at the first device, an amount of power available to be received via the wireless power connection and an amount of power available to be received via the wired power connection. The state of the first device may include an amount of power the first device may receive during charging. The amount of power may be based on the current battery state and the configuration of the first device. For example, a small power receiving device such as a headphone or sport band (e.g., FitBit®, Garmin Vivosmart®) may draw less than 2 watts and larger devices such as laptops may draw over 35 watts. Other power receiving devices such as smart phones, tables, gaming devices, etc. may draw power within a range of 1-50 watts. The addition of the first device (i.e., the corresponding amount of power required) to a wireless power source may cause the cumulative total of power required to exceed the capabilities of the wireless power source. In some instances, the wireless power source may be configured to secure charging operations with one or more of the devices. In other cases, the wireless power source may be configured to initiate a power sharing mode. For example, the AirFuel Alliance standards allows for the implementation of power sharing such that instead of denying charge to a receiving device (e.g., the first device which was the last receiver added to the wireless power supply), each of the devices that are receiving power from the wireless power source will cumulatively drop (e.g., 66%) of their original request for power. The power sharing causes the whole system (e.g., the wireless power supply and the power receiving devices) to enter a new equilibrium state where the total requested received power is less than the total available transmit power but all devices are charging 25% slower. In this example, the control circuit 516 may be configured to determine the decrease on power being supplied to one or more of the other device based on an indication received from the wireless power source via the wireless connection 517, in-band signaling, or via other wireless communications from the other devices directly.

At stage 906, the method includes selecting, by the first device, to receive power from the wired power connection or the wireless power connection based on the determination. In an example, the control circuit 516 may be configured to receive power from the wired source in an effort to preserve the charging status of the other devices that are currently receiving power from the wireless power source. This allows the first device to prevent the wireless power source from entering a power limiting state (e.g., power sharing). The selection of the wired power source may be made even if the available power from the wired source is less than the power limited value of the wireless power source. In another example, the control circuit 516 may be configured to select the wired power supply if the power transfer from the wired supply is greater than the power limited value available from the wireless power supply.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of operations may be undertaken before, during, or after the above elements are considered. Accordingly, the above description does not bound the scope of the claims.

The invention claimed is:

1. An apparatus for receiving power from a wired power supply and a wireless power supply, comprising:
   a wireless power receiver configured to receive power from the wireless power supply;
   a direct current input circuit configured to receive power from the wired power supply; and
   a control circuit operably coupled to the wireless power receiver and the direct current input circuit and configured to:
      determine a power transfer capability for each of the wired power supply and the wireless power supply, wherein the control circuit is configured to obtain a signal indicative of the power transfer capability of the wireless power supply from the wireless power supply;
      select the wireless power receiver from the wireless power supply or with the direct current input circuit from the wired power supply to receive power based on the power transfer capabilities, wherein the control circuit is configured to select a power supply having a highest power transfer capability from the wireless power supply and the direct current input; and
      monitor an amount of power being delivered by the wireless power supply or the wired power supply and transmit a signal comprising a control command to alter the amount of power output by the wireless power supply, and select the wireless power supply upon a detection of a decreased amount of power being delivered by the wired power supply.

2. The apparatus of claim 1, wherein the control circuit is further configured to determine one or more charge state values associated with the apparatus; and wherein the selection is further based on the one or more charge state values.

3. The apparatus of claim 2 further comprising a thermal sensor and the one or more charge state values includes a temperature value.

4. The apparatus of claim 2 further comprising a battery and the one or more charge state values includes a battery charge value.

5. The apparatus of claim 2 wherein the apparatus is configured to detect a proximate device and the one or more charge state values includes an indication of the proximate device.

6. The apparatus of claim 1 wherein the direct current input circuit is operably coupled to the wired power supply via a Universal Serial Bus (USB) connector.

7. The apparatus of claim 6 wherein the control circuit is configured to determine the power transfer capability of the wired power supply based on a state of a data line in the USB connector.

8. The apparatus of claim 6 wherein the control circuit is configured to determine the power transfer capability of the wired power supply based on an enumeration process with the wired power supply.

9. An apparatus for receiving power from a wired power supply and a wireless power supply, comprising:
   means for receiving power from the wireless power supply;
   means for receiving power from the wired power supply;
   means for determining a charger type associated with the wired power supply, the charger type indicative of a power transfer capability of the wired power supply;
   means for determining a power transfer capability for the wireless power supply, wherein the means for determining a power transfer capability for the wireless power supply comprises means for obtaining a signal indicative of the power transfer capability of the wireless power supply from the wireless power supply;
   means for selecting the wireless power supply or the wired power supply to receive power based on the power transfer capabilities, wherein the means for selecting comprises means for selecting a power supply having a highest power transfer capability from the means for receiving power from the wired power supply and the means for receiving power from the wired power supply;
   means for monitoring an amount of power being delivered by the wireless power supply or the wired power supply;
   means for transmitting a signal comprising a control command to alter the amount of power output by the wireless power supply upon selection of the wireless power supply; and
   means for selecting the wireless power upon a detection of a decreased amount of power being delivered by the wired power supply.

10. The apparatus of claim 9, further comprising means for determining one or more charge state values associated with the apparatus; and wherein the means for selecting is further based on the one or more charge state values.

11. The apparatus of claim 10 further comprising a means for measuring a temperature on the apparatus, wherein the one or more charge state values includes a temperature value.

12. The apparatus of claim 10 further comprising means for measuring a charge on a battery, wherein the one or more charge state values includes a battery charge value.

13. The apparatus of claim 10 wherein the means for determining a power transfer capability for the wireless power supply is configured to detect a proximate device and the one or more charge state values includes an indication of the proximate device.

14. The apparatus of claim 9 wherein the means for receiving power from the wired power supply is a Universal Serial Bus (USB) connector.

15. The apparatus of claim 14 wherein the means for determining a charger type associated with the wired power supply is based on a state of a data line in the USB connector.

16. The apparatus of claim 14 wherein the means for determining a charger type associated with the wired power supply is based on an enumeration process with the wired power supply.

17. An apparatus for receiving power from a wired power supply and a wireless power supply, comprising:
- a wireless power receiver configured to receive power from the wireless power supply;
- a direct current input circuit configured to receive power from the wired power supply; and
- a control circuit operably coupled to the wireless power receiver and the direct current input circuit and configured to:
  - determine a charger type associated with the wired power supply, the charger type indicative of a power transfer capability of the wired power supply;
  - determine a power transfer capability for the wireless power supply, wherein the control circuit is configured to obtain a signal indicative of the power transfer capability of the wireless power supply from the wireless power supply;
  - select the wireless power receiver from the wireless power supply or with the direct current input circuit from the wired power supply to receive power based on the power transfer capabilities, wherein the control circuit is configured to select a power supply having a highest power transfer capability from the wireless power supply and the direct current input; and
  - monitor an amount of power being delivered by the wireless power supply or the wired power supply and transmit a signal comprising a control command to alter the amount of power output by the wireless power supply, and select the wireless power supply upon a detection of a decreased amount of power being delivered by the wired power supply.

* * * * *